March 2, 1965 E. W. BERGMANN 3,171,518
CONSTRUCTION FOR ADJUSTING THE RELATIVE
POSITION OF SCREW CONNECTED PARTS
Filed July 17, 1959

INVENTOR.
ERICK W. BERGMANN
BY
Farley Forster & Farley
ATTORNEYS

United States Patent Office 3,171,518
Patented Mar. 2, 1965

3,171,518
CONSTRUCTION FOR ADJUSTING THE RELATIVE
POSITION OF SCREW CONNECTED PARTS
Erick W. Bergmann, 1515 Hurd Road, Monroe, Mich.
Filed July 17, 1959, Ser. No. 827,914
4 Claims. (Cl. 189—36)

This invention relates to an improved construction for mounting a screw used to connect two parts together so that the relative position of these two parts can be adjusted and precisely maintained.

There are numerous known instances where it is desirable to connect two parts together by the use of a screw which is threaded into one of the parts and which has a head engaging a cylindrical recess in the other part. For each size of screw, standard dimensions have been established and are used for the diameters of the recess and the clearance hole through which the shank of the screw extends. In many instances, after the clearance hole and recess have been formed in one part and the hole for the screw tapped in the other part, it becomes necessary to change the relative position of the two parts established by the location of these holes. If the change is more than a very nominal one, it requires either the making of a special screw or the locating and forming of a new set of holes in one or both of the parts.

The present invention provides a simple and effective construction for permitting such an adjustment through a relatively wide range with the use of standard cap screws. This adjustment is accomplished by establishing a new standard set of dimensions for the screw clearance hole and the recess for the head of the screw, these dimensions being appreciably greater than present standards. A set of washers are provided for each size of screw. These new washers have an outside diameter corresponding to that of the oversize recess and an aperture to receive the shank of the screw. In each set of washers the aperture location is varied from one where the center is concentric with the center of the outside diameter through a range of offsets or eccentricity between the two centers. When the desired relative position is established between the two parts, the washer is selected which has the proper location of the shank receiving aperture to correctly align the screw with the tapped hole it is to engage.

Figure 1:
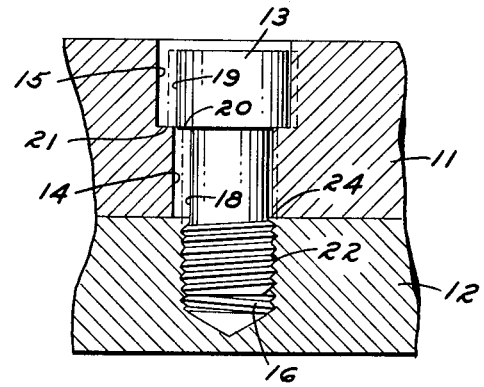
Figure 2:
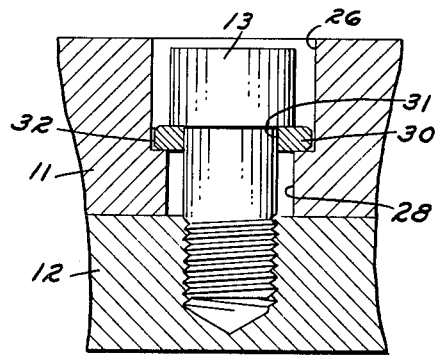
Figure 3:
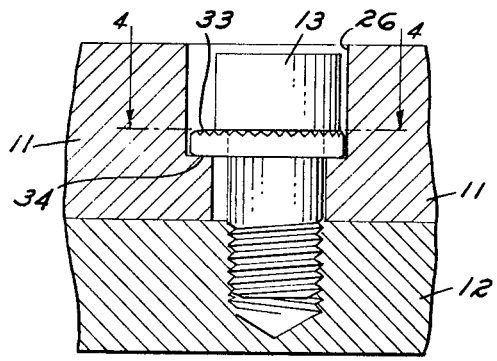
Figure 4:
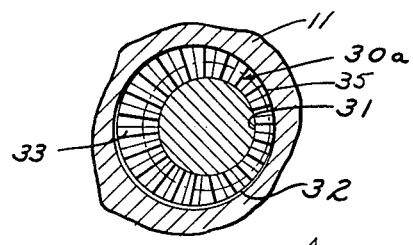
Figure 5:
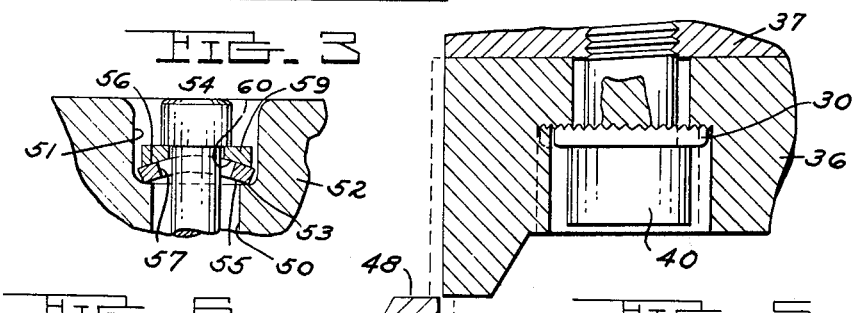
Figure 6:
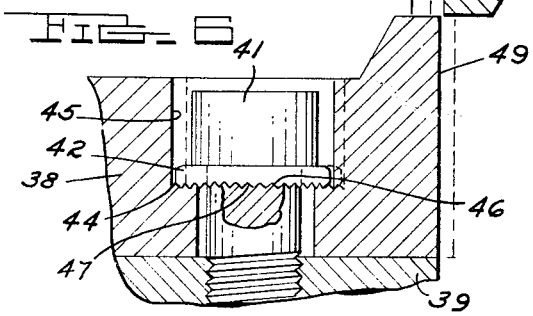

When a screw is mounted in this way, its location is established in the recess in spite of the clearance provided. Furthermore, a firm bearing is created for the head of the screw. The invention is illustrated in the accompanying drawings which comprise the following views:

FIGURE 1, a sectional elevation taken through two parts connected by a cap screw and showing one expedient now employed for shifting the parts or adjusting their relative position;

FIGURE 2, a similar elevation showing the improved construction of the invention;

FIGURE 3, a view corresponding to FIGURE 2 but showing the two parts connected in a different relative position;

FIGURE 4, a sectional plan view taken on the line 4—4 of FIGURE 3;

FIGURE 5, a sectional elevation illustrating the application and utility of the invention for parts such as dies and the like; and FIGURE 6, a sectional elevation showing an alternate construction.

Referring to FIGURE 1, parts 11 and 12 are shown connected together by a screw 13 which is mounted in a clearance hole 14 having a counterbored recess 15. The shank of the screw extends through the clearance hole 14 and is threaded into a tapped hole 16 in the part 12. FIGURE 1 illustrates a condition which frequently arises. For some reason, it has been necessary to shift the position of part 11 relative to part 12. In order to do this the screw 13 has had its shank portion 18 and head 19 ground down to smaller diameters. As a result, the shoulder 20 at the head of the screw only partially contacts the shoulder 21 at the bottom of the counterbored recess; furthermore, the threaded portion 22 of the screw extends underneath the portion 24 of the part 11 and will probably be ruined when the screw is removed.

Obviously, this expedient for adjusting the relative position of the part 11 to the part 12 is unsatisfactory, expensive and time consuming. Nevertheless, it is one which is frequently employed in shop practice.

These objectionable features are completely cured by the construction shown in FIGURES 2–4 which illustrate the same two parts 11 and 12 connected by a screw 13 which is mounted in accordance with the invention. The screw receiving hole in part 11 consists of a counterbored portion 26 of enlarged diameter and a correspondingly enlarged clearance hole 28. The screw 13 is a standard one and is mounted in the counterbored recess 26 on a washer 30 which is formed with a center aperture 31 concentric with the external diameter 32. This washer 30 will accurately locate and rigidly support the screw 13 in the enlarged holes in the part 11.

FIGURES 3 and 4 illustrate the manner in which the location of part 11 can be changed relative to part 12 by the use of the invention. When this relative location has been established the washer 30a shown in plan in FIGURE 4 is selected from the set of washers provided. The aperture 31 of this washer is formed in offset or eccentric relation to its outside diameter 32, the amount of eccentricity approximately corresponding to the amount part 11 has been shifted from the position shown in FIGURE 2. This washer 30a is inserted in the counterbored recess 26 and the screw 13 is threaded into the part 12 in the usual manner. Again, the washer 30a locates the screw in the enlarged holes of the part 11 and provides a firm bearing between the screw and the shoulder 34 of the recess.

As an optional feature, the washer 30a may be provided with a roughened or serrated upper surface 33 as shown. When this surface is engaged by the head of the screw 13, the washer will rotate with the screw into wedging engagement with the face of the recess 26 as indicated at 35 in FIGURE 4. Since this engagement takes place on a locking angle (1 degree or less), the washer will have a locking action with very little tendency to shift the position of the part 11.

It is presently contemplated that the washers 30 will be supplied in sets having a range of offsets from a standard concentric relation between the outside diameter and the aperture. Each set of washers would be usable with a standard size of cap screw and with a new standard for the diameters of the clearance hole and the counterbore. Each washer in a set will be identified by a number, for example, from zero indicating a concentric relation, through 8, with each successive number in the series indicating an offset increasing by some dimensional increment. For example, washer No. 1 would have an offset of 1/64"; washer No. 8 would have an offset of 8/64" or 1/8". This example of one manner in which the various dimensions may be established is illustrated by the following table which in columns 1 and 2 show the presently accepted standardized sizes of cap screws, clearance holes and counterbores. Column 3 gives the new standard of enlarged diameters for clearance holes and counterbores for washer sizes 0 through 4, and the last column gives the new diameters of clearance holes and counterbores for washer sizes 5 through 8.

formed when the part 52 is cast. In such a case the shoulder 53 of the recess will be rough and irregular. In order to avoid the necessity of machining this surface and still obtain an accurate positioning of the cap screw 54, an auxiliary washer 55 is employed. This washer has an upper spherical surface 56 and a center hole 57 which is approximately equal in diameter to the diameter of the clearance hole 50. The head of the cap screw 54 is seated on a second washer 59 constructed in accordance with the invention but with the lower surface 60 thereof tapering inwardly, preferably for line contact with the upper surface 56 of the washer 55.

After the washer 59 with the proper amount of eccentricity has been selected and assembled on the cap screw

*Table of hole sizes and counterbores required for use of various washers with screw sizes shown*

| Socket Head Cap Screw Diameters | | Standard Diameter of— | | Hole Diameter For O-C Washers #0 Through #4 | | Hole Diameter For O-C Washers #5 Through #8 | |
| --- | --- | --- | --- | --- | --- | --- | --- |
| Screw Dia. | Head Dia. | Clearance Hole | Counter Bore | Clearance Hole | Counter Bore | Clearance Hole | Counter Bore |
| 1/4 | 3/8 | 9/32 | 13/32 (a) | 13/32 | 19/32 (c) | ------- | ------- |
| 5/16 | 7/16 | 11/32 | 15/32 (b) | 15/32 | 21/32 (d) | ------- | ------- |
| 3/8 | 9/16 | 13/32 | 19/32 (c) | 17/32 | 25/32 (e) | ------- | ------- |
| 7/16 | 5/8 | 15/32 | 21/32 (d) | 19/32 | 27/32 (f) | ------- | ------- |
| 1/2 | 3/4 | 17/32 | 25/32 (e) | 21/32 | 29/32 (g) | 25/32 | 1 1/32 (h) |
| 5/8 | 7/8 | 21/32 | 29/32 (g) | 25/32 | 1 1/32 (h) | 29/32 | 1 5/32 (i) |
| 3/4 | 1" | 25/32 | 1 1/32 (h) | 29/32 | 1 5/32 (i) | 1 1/32 | 1 9/32 (j) |
| 1" | 1 1/4 | 1 1/32 | 1 9/32 (j) | 1 5/32 | 1 13/32 (k) | 1 9/32 | 1 17/32 (l) |

FIGURE 5 gives a graphic illustration of the utility of the invention. Part 36 is mounted on a base member 37 and part 38 similarly mounted in opposing relation on a base member 39. These two parts 36 and 38 are each held in place by 3/4" cap screws 40 and 41 respectively and the screws are mounted in clearance holes and counterbores formed in accordance with the standards given in column 4 of the table above for a 1" screw. Each of the cap screws 40 and 41 engage a washer 42 constructed in accordance with the invention but with an additional optional modification. The surface of the shoulder 44 of the counterbored portion 45 of each hole is provided with serrations 46, and the lower surface of the washers 42 are formed with similar serrations 47. When the washer is installed in the hole, the engagement between the serrations 47 and 46 prevent the washer from rotating when the screw is tightened and thus prevent the washer from shifting from the desired position.

With this construction, each of the parts 36 and 38 can be adjusted through a range of 1/8" as indicated in phantom for a total adjustment of 1/4", using washers 0 through 4 from the 1" screw set, and washers 5 through 8 from the 3/4" screw set. In each position throughout this range, the parts 36 and 38 will be rigidly mounted and accurately held in position. These parts might, for example, be a pair of dies for performing a shearing operation. In such a case, a quarter of an inch of relative movement has been provided at a cost that is practically negligible. With present practice the parts 36 and 38 could only be shifted by a process of repeatedly drilling out and plugging the tapped holes provided in their respective base members 37 and 39, and locating, drilling and tapping new holes. In many cases wear on dies occurs to an appreciable extent on each of the cutting faces 48 and 49 and with respect to the face 49 such wear can only be taken care of by grinding this face and relocating the die on its mounting member.

FIGURE 6 shows a further modification where the invention is used with a clearance hole 50 and recess 51 formed in a part 52 and where at least the recess 51 is not machined. The recess 51 may, for example, be 54, tightening of the screw is accompanied by a self-seating action of the washer 59 on the washer 55. Some flexing of the washer 55 will also result, producing a locking action on the screw.

Those skilled in the art will readily recognize many other applications for the invention, the scope of which is defined in the following claims.

I claim:

1. Means for adjusting the relative position between two members which are connected together in abutting relation by a cap screw the shank and head of which are received respectively in main and recessed portions of a counterbored hole in one of said members and the threaded end of said screw engaging a threaded hole in the other of said members, said adjusting means comprising one of a set of washers, each of said washers having a pair of opposed circular faces of equal diameter one of which is engageable with the bottom of said recessed hole portion, a cylindrical edge surface having an outside diameter corresponding to the inside diameter of the recessed portion of said counterbored hole and an aperture adapted to receive the shank of said screw, said counterbored hole having main and recessed portions whose diameters are oversize relative to the size of the shank and head respectively of said cap screw, the centers of said apertures of the washers of said set being offset relative to the center of said cylindrical edge portion in progressively increasing amounts between zero and the maximum radial clearance between said cap screw shank and the main portion of said counterbored hole, whereby said one washer positions said screw in the counterbored hole with the axis of the screw aligned with the axis of the threaded hole.

2. The combination set forth in claim 1 wherein each of said washers which has an off-set aperture is provided with a roughened surface for engagement by the head of said screw whereby said washer will rotate with said screw to bring said washer edge surface into wedging contact with the recessed portion of said hole to lock said screw against rotation.

3. The combination set forth in claim 1 wherein each of said washers is provided with a depression in the face thereof which is opposite to the face to be engaged by the head of said screw, and a second washer having a spherical face engaging said depression, said second washer having a central aperture greater in diameter than that of said first washer whereby said first washer can move transversely of said hole on said second washer when said screw is tightened.

4. The combination according to claim 3 wherein said second washer is cup-shaped and relatively resilient to exert a locking action on said screw.

References Cited in the file of this patent

UNITED STATES PATENTS

| | | |
|---|---|---|
| 122,676 | Stouffer | Jan. 9, 1872 |
| 1,429,117 | Thomas | Sept. 12, 1922 |
| 1,854,277 | Schatz | Apr. 19, 1932 |
| 1,934,232 | Kueffel | Nov. 7, 1933 |
| 2,125,396 | Olshevsky | Aug. 2, 1938 |
| 2,216,208 | Michon | Oct. 1, 1940 |
| 2,868,339 | Lazarowicz | Jan. 13, 1959 |
| 3,006,443 | Siler | Oct. 31, 1961 |

FOREIGN PATENTS

| | | |
|---|---|---|
| 205,849 | Australia | Jan. 29, 1957 |